(No Model.) 6 Sheets—Sheet 2.

C. A. CHANDLER.
MACHINE FOR MAKING PAPER BAGS.

No. 285,392. Patented Sept. 25, 1883.

Witnesses.
L. F. Connor.
Jos. P. Livermore.

Inventor.
Clarence A. Chandler.
by Crosby & Gregory, Attys.

(No Model.) 6 Sheets—Sheet 4.

C. A. CHANDLER.
MACHINE FOR MAKING PAPER BAGS.

No. 285,392. Patented Sept. 25, 1883.

Witnesses.
L. F. Connor.
Jos. P. Livermore

Inventor.
Clarence A. Chandler,
by Crosby & Gregory
Attys

N. PETERS, Photo-Lithographer, Washington, D. C.

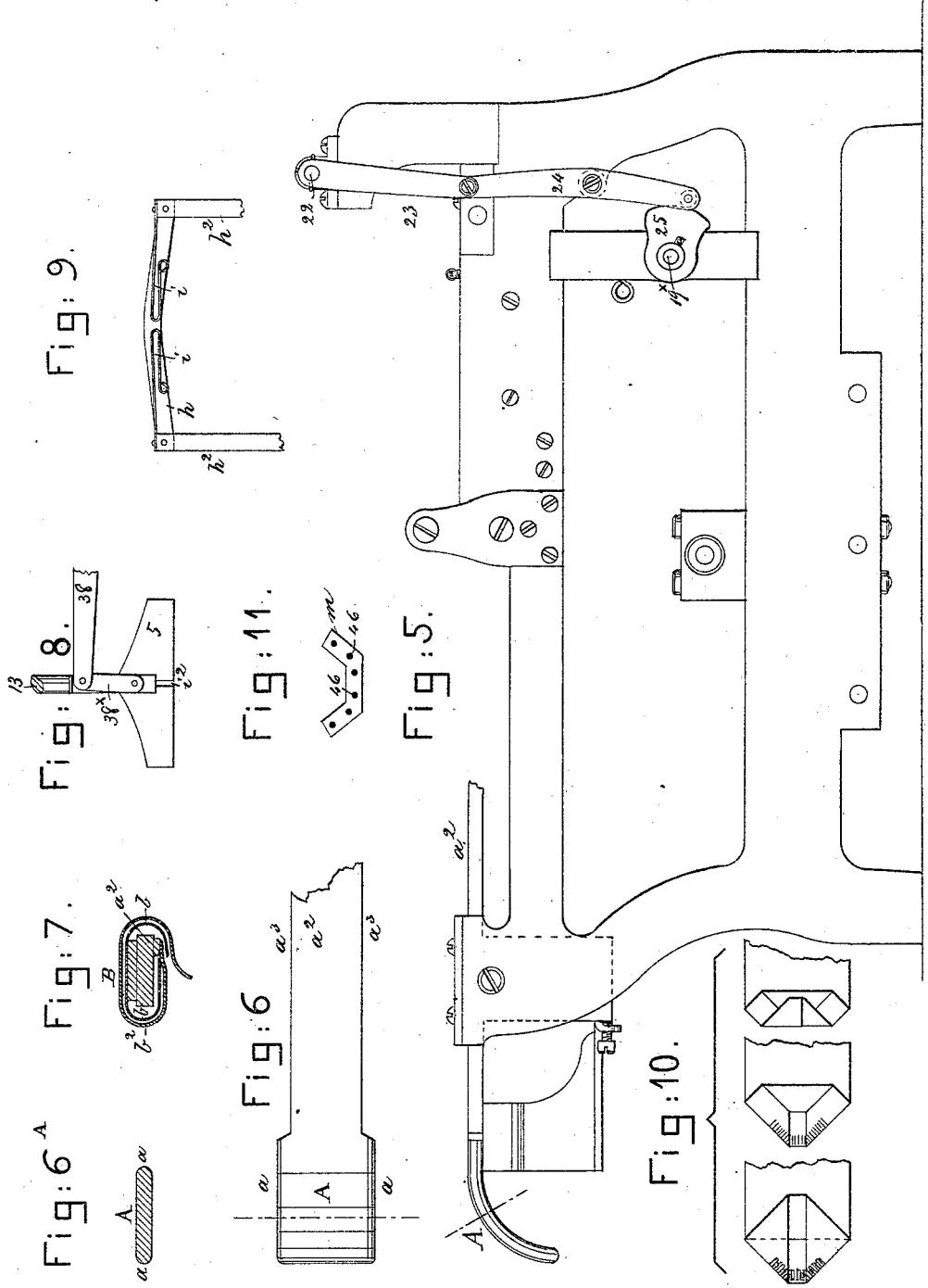

(No Model.) 6 Sheets—Sheet 6.

C. A. CHANDLER.
MACHINE FOR MAKING PAPER BAGS.

No. 285,392. Patented Sept. 25, 1883.

Witnesses.
L. F. Connor.
Jos. P. Livermore.

Inventor.
Clarence A. Chandler,
by Crosby & Gregory, Attys.

UNITED STATES PATENT OFFICE.

CLARENCE A. CHANDLER, OF EAST BRIDGEWATER, MASSACHUSETTS.

MACHINE FOR MAKING PAPER BAGS.

SPECIFICATION forming part of Letters Patent No. 285,392, dated September 25, 1883.

Application filed March 27, 1880. (No model.)

*To all whom it may concern:*

Be it known that I, CLARENCE A. CHANDLER, of East Bridgewater, in the county of Plymouth and State of Massachusetts, have invented an Improvement in Machines for Making Paper Bags, of which the following description, in connection with the accompanying drawings, is a specification.

This invention relates to machinery for making satchel-bags from a web of paper, and is an improvement on United States Patent No. 116,842, July 11, 1871, and reissued May 18, 1880, as No. 9,202, and No. 220,925, October 28, 1879, granted to M. E. Knight, to which reference may be had.

Figure 1:
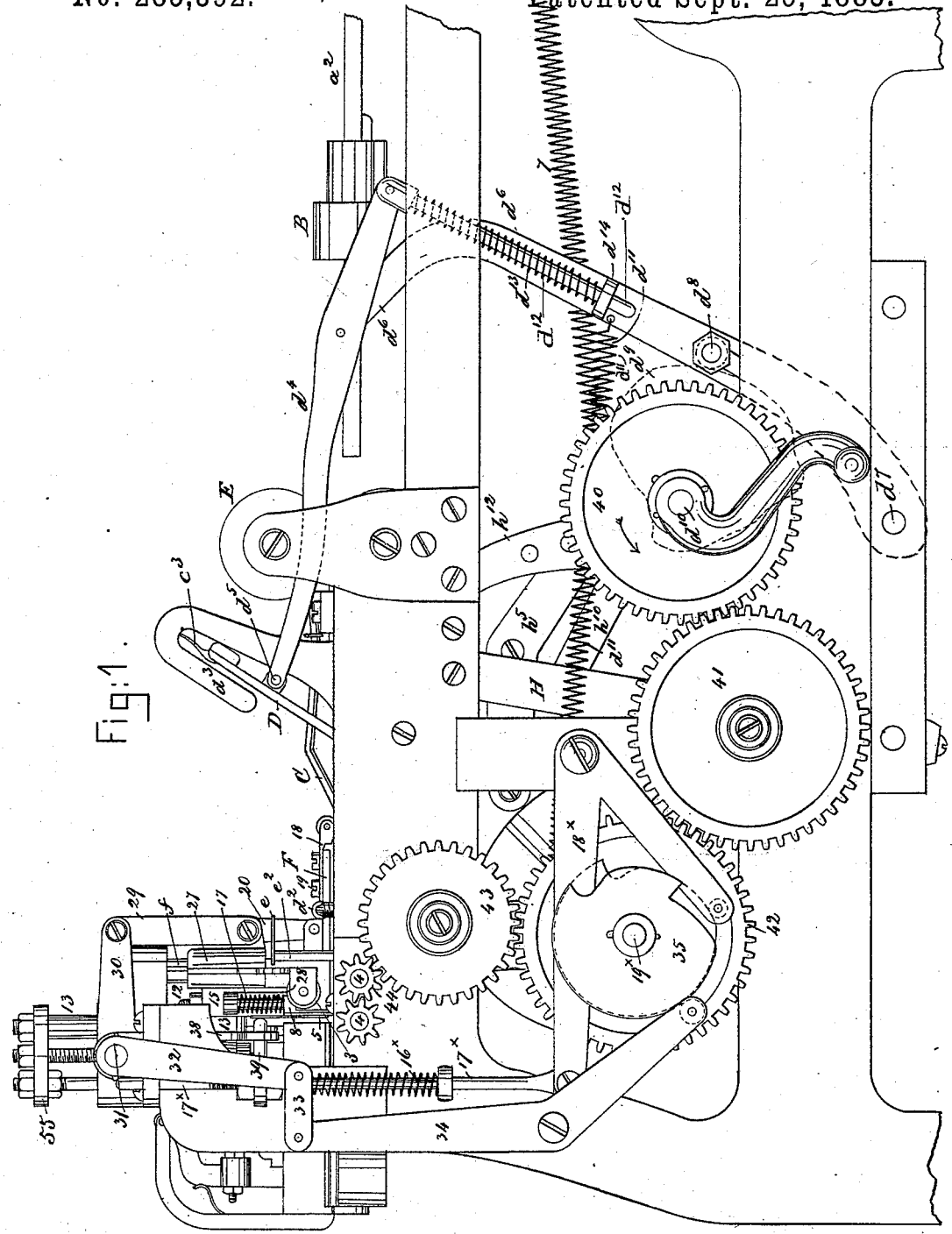
Figure 2:
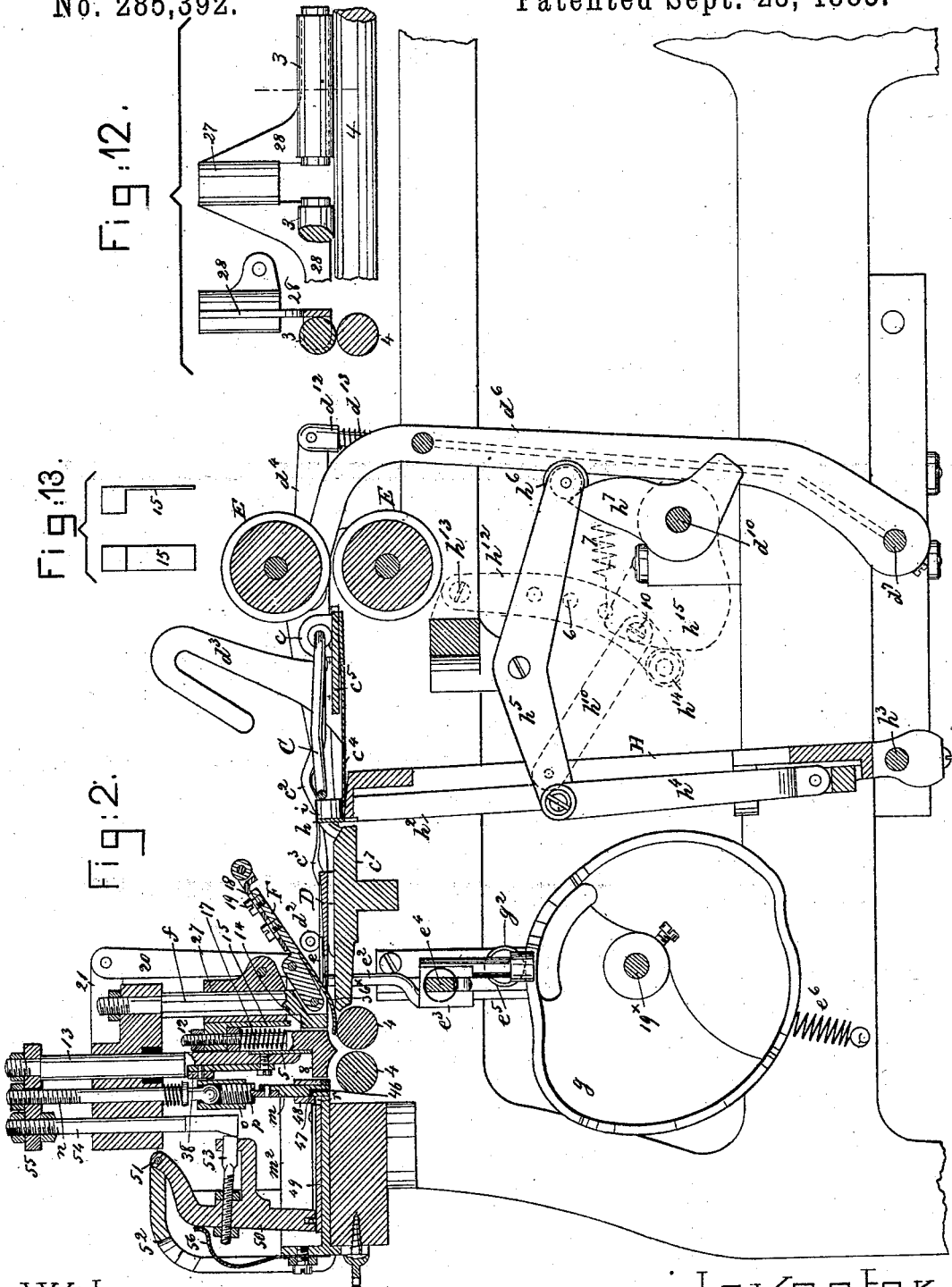
Figure 3:
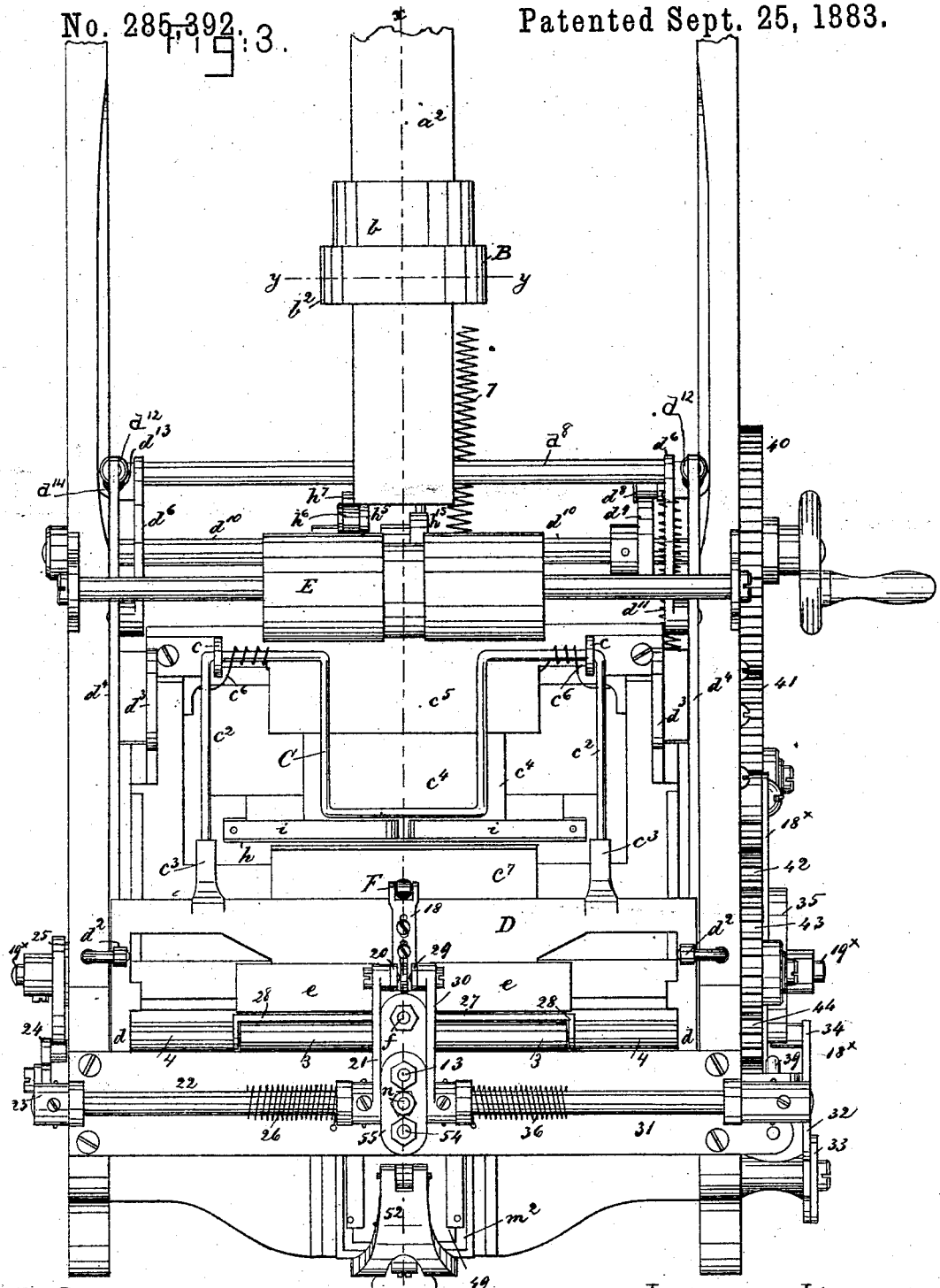
Figure 4:
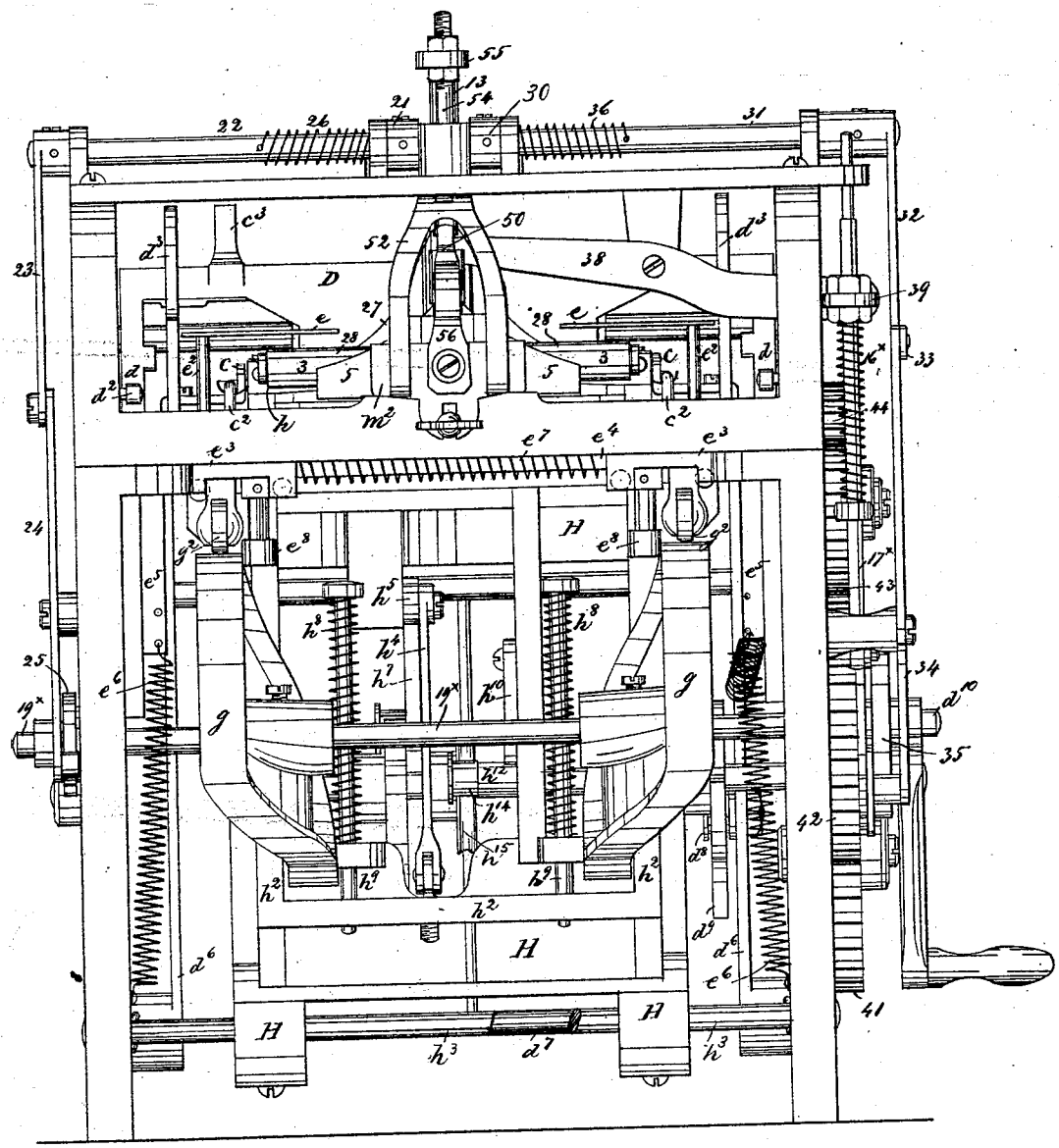
Figure 14:
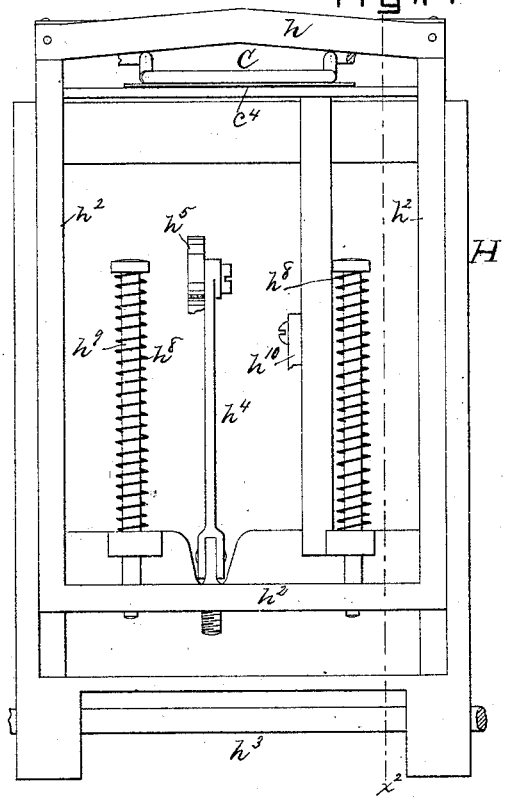
Figures 15, 16, 17:
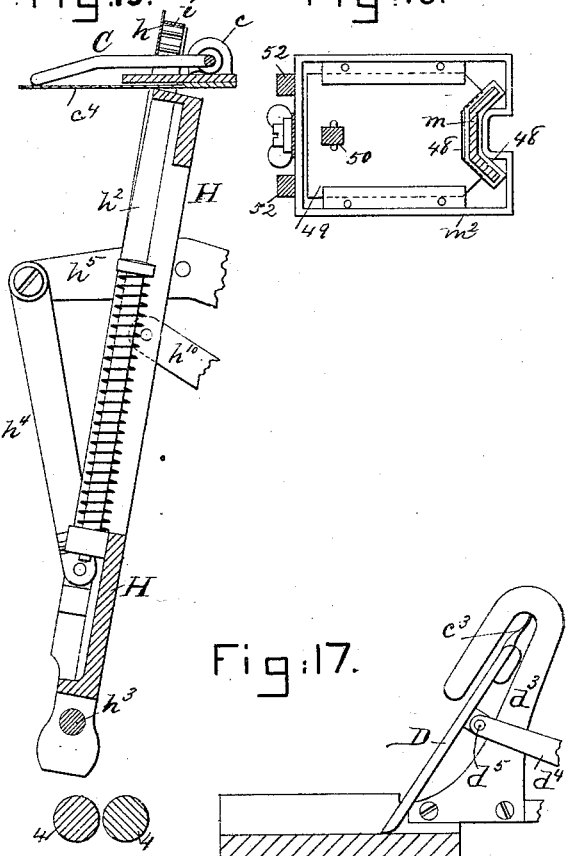
Figures 18, 19:
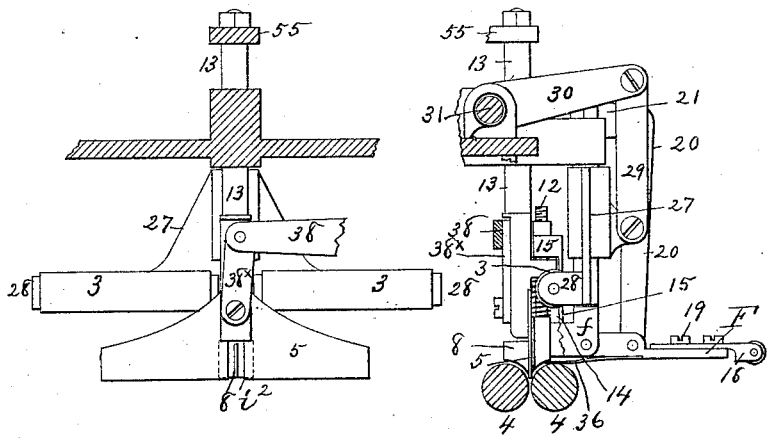

Figure 1 is a left-hand side elevation of a machine containing my improvements; Fig. 2, a longitudinal vertical section of Fig. 3 on the dotted line $x\ x$, the tube-former and guide being omitted; Fig. 3, a top view of Fig. 1; Fig. 4, a view of the delivery end of the machine, the parts being as in Fig. 1; Fig. 5, a right-hand-side view of the frame and devices outside of it; Figs. 6 $6^a$, a top view and section of the enlarged end of the former; Fig. 7, a cross-section of the tube-sizing guide on the line $y\ y$, Fig. 3, on a reduced scale from that of said figure, and on a larger scale than Figs. 6 and $6^a$; Fig. 8, a face view of the final folder-blade, with attached parts to lift it; Fig. 9, a rear side view of the tube-cutting devices, showing the presser-springs attached thereto; Fig. 10, details of the diamond fold and its two cross or final folds; Fig. 11, a bottom view of the pasting-plunger; Fig. 12, a detail showing the movable head and rollers; Fig. 13, a detail of the finger or stop 15. Fig. 14 is a detail in front elevation of the tube cutter and presser; Fig. 15, a vertical section of Fig. 14 on the dotted line $x^2$; Fig. 16, a detail showing in top view the interior of the paste-box, the paste-plunger being in section; Fig. 17, a detail showing in elevated position the feeding-blade, which descends upon the tube to feed it under the finger or nose; Fig. 18, a detail showing the final folding-blade and the rollers, which co-operate with the side plates to crease the diamond fold; and Fig. 19 is a detail, partially in section, showing the delivery-rollers, the finger, the final folding-blade, one of the rollers which aid in creasing the edges of the diamond fold, and the corner guide and stop to control its position, as will be described.

In this my machine it will be understood that the paper bags will be produced from a web of paper suitably supported and delivered to the former, which, excepting in certain details, hereinafter described, is like other formers heretofore used in bag-machines. The diamond fold will be formed by the finger that acts within the end of the tube, as in the said Knight patents, and with the said finger I shall employ the first cross-folder blade, as in the Patent No. 220,925, (1879;) but in this application I have omitted the said blade to avoid confusion.

The first part of my invention relates to the construction of the forming device used to bring the web of paper into tube form. I have made the rear end, A, of the former considerably larger or wider than at or within the tube-sizing guide B, that determines the lap of the tube and its size, and have made its outer edges, $a$, parallel, and sufficiently thick to obviate the formation of longitudinal creases in the tube. The paper, partially turned into tube form about the enlarged rear end of the former, has its edges finally lapped, and gaged and sized internally by the guide B, that embraces a reduced part, $a^2$, of the former. The web of paper is led from the end A of the former into the guide B, and between its walls $b$ and $b^2$, and to size and shape the bag-tube the outer face of the inner wall, $b$, of the said guide is of substantially the same area in cross-section as the enlarged rear end of the former, and its sides are parallel, and the inner face of the outer wall, $b^2$, of the guide closes the web of paper into tube form about the wall $b$ and gages the internal size of the tube and extent of the lap at the edges of the tube. This construction avoids friction on the paper to the extent heretofore common, and the former being cut away or reduced along its edges $a^3$, (see Fig. 6,) enables the tube to be lapped at its edges and pasted without any liability to form wrinkles. I have not shown the pasting device for the tube, as it will be of usual construction. In practice I propose to employ within the tube a follower, substantially as in United States Patent No. 215,578, May 20, 1879, to which reference may be had.

Another part of my invention relates to means for holding down the leading end of the tube as the feeding-blade and first cross-folder (not shown) are moved back from their forward position. This holder C is herein shown as a bent rod supported in ears $c$, and provided with arms $c^2$, which are extended forward to be acted upon by toes $c^3$, carried by the feeding-blade D, they operating, on the backward movement of the said blade, to depress the holder upon the top of the tube, the under side of the tube, at its front, resting upon the elastic or spring-metal plates $c^4$, connected with the rigid bed $c^5$ in advance of the feeding-rolls E, of usual construction and operation. The arms $c^2$ are held normally up by suitable springs, $c^6$. (Shown clearly in Fig. 3.) $c^7$ is the bed.

Another part of my invention relates to the times and order of movement of the feeding-blade and side plates with relation to each other, and the usual first cross-folder blade and final folder-blade, whereby the width of the bag-bottom is always the same, notwithstanding variations in the speed of operating the machine. In this part of my invention the feeding-blade stops in its forward position before the final cross-folder starts to descend, where it rests until the said folder substantially completes its descent, which insures placing the diamond fold in the proper position under all conditions of working, which would not be the case if the feeding-blade had a reciprocating movement without rest at its forward stroke.

The feeding-blade D, extended across the machine, is provided with guiding-arms $d$, that enter suitable guideways in the frame and pass under anti-friction rollers $d^2$, into a slot in the yoke $d^3$, when the blade is drawn back, as in Fig. 1. The blade D is jointed at its opposite sides at $d^5$ to the ends of levers $d^4$, pivoted upon a vibrating frame or lever-carrier, $d^6$, pivoted at $d^7$. This frame is provided with an adjustable pin or roll, $d^8$, which is struck by the cam $d^9$ (shown in dotted lines, Fig. 1) on the driven shaft $d^{10}$. A spring, $d^{11}$, moves the blade D forward at the suitable intervals, or when the stroke of the cam $d^9$ will permit. The rear end of each lever $d^4$ has hinged upon it a stud, $d^{12}$, that enters a spiral spring, $d^{13}$, and then an ear, $d^{14}$, on the arm of the frame $d^6$. The normal tendency of springs $d^{13}$ is to throw the forward end of lever $d^4$ down, and with it the feeding-blade. The cam $d^9$ is so shaped that the feeding-blade is thrown down under the usual first cross-folder blade, (not shown, but fully described in Patent No. 220,925,) and engaging the tube along the center crease or fold of the diamond fold. The blade feeds the tube forward until the forward end of the diamond fold, formed by the action of the finger F and the usual first folder-blade, is passed under the side plates, $e$, for a suitable distance, at which time the rollers 3 descend and fold down or crease the two diagonal folds of the leading end of the diamond fold. This done, the side plates descend, the rollers 3 are lifted, and while the feeding-blade rests the usual first cross-folder blade (shown in Patent No. 220,925) is moved forward to make the first cross-fold at the rear corner of the diamond fold, that corner being laid over upon the side plates, as usual. Then the side plates are withdrawn laterally by devices to be hereinafter described, the first cross-folder is withdrawn, and the feeding-blade is moved forward to place the leading end of the diamond fold in proper position above the set of delivery-rollers 4, of usual construction, and under the usual final folder-blade, 5, common to all of the said patents. The diamond fold being in proper position, as described, with reference to blade 5, the feeding-blade is brought to rest in its most forward position until the blade 5 descending creases the leading end of the diamond fold for the final cross-fold and tucks the paper between the rollers 4, which deliver the bag. Prior to the operation of forming the cross-folds the tube is cut off transversely by means of a cutter, next to be described, carried by a vibrating frame.

The cutter or blade $h$ is attached to the upper end of a frame, $h^2$, fitted within and adapted to be slid longitudinally within the vibrating cutter-carrier H, pivoted at $h^3$. The frame $h^2$ has attached to it, near its center, a link, $h^4$, connected with a pivoted lever, $h^5$, having a bowl, $h^6$, that is acted upon by the cam $h^7$ to lower or throw down the frame $h^2$ and cutter-blade at the proper times, as when the carrier H is in its forward position, springs $h^8$ on the guided rods $h^9$ lifting the said frame and cutter-blade at the proper times, as when the carrier is to be moved backward.

The carrier has jointed with it a link, $h^{10}$, that at its other end is connected adjustably, by a pin or otherwise, with a vibrating radius-bar, $h^{12}$, provided with a stud or bowl, $h^{14}$, that is operated upon by the cam $h^{15}$ (shown in dotted lines, Fig. 2) on the shaft $d^{10}$. The radius-bar $h^{12}$, the carrier H being back in position nearest the feed-rollers E, is provided with a series of holes, 6, made in the arc of a circle of which the link $h^{10}$ is the radius. The spring 7, acting upon the radius-bar $h^{12}$, always moves it and the carrier H back to the same position without reference to which one of the holes 6 receives the pin 10, connecting the link $h^{10}$ with it; but the carrier will be moved forward a greater or less distance, according to which one of the said holes is occupied by the said pin; but I lay no claim to this general mode of constructing the cutter-operating mechanism, as it is old.

At the rear of the cutter-blades, and secured at one end to the frame $h^2$, are the two pressers $i$ $i$, (see Figs. 2 and 3,) made as springs, and shaped as shown in Fig. 9. These pressers, as the frame $h^2$ descends near the feeding-rollers, as it does just before the feeding-plate starts to return and rise above the tube, strike the holder C and assist in pressing it down upon the tube; but the frame $h^2$ and pressers rise as the feeding-blade reaches its highest position, Fig. 1. As the frame $h^2$ descends in its forward position, at which time the tube is severed into a bag-length, the pressers strike the tube and press and hold it down, yielding as the cutter-blade passes through the tube; and the said pressers continue to bear upon and hold the tube in place until the edge of the cutter is withdrawn from the paper. This prevents the cutter in its backward movement from catching the open end of the tube and bending it out of shape, as it might do, and give the finger trouble to enter it.

The final folding-blade 5 is provided with a central passage, $i^2$, (see Figs. 8 and 18,) to receive the rear end of the lip or corner-controlling device 8, (see Figs. 2 and 19,) attached to the adjustable rod 12, guided in an ear or lug at the front of the slide-rod 13, to which the final folder 5 is attached. The lower end of this corner-controlling device has two concaved faces, corresponding in curvature with the rollers 4, and just before the final folder-blade descends to make the final fold the said device 8 is arrested very near, but so as not to touch the roller 4 under it, and in such position the corner of the first cross-fold made over the side plates, as described, is given a downward direction or curvature to cause it to remain down and pass through between the delivery-rolls 4 without being turned backward or unfolded. The rearmost concaved surface holds down the rearmost pasted corner of the diamond fold and prevents it from wiping along over the rear side of the final folding-blade. The slide-rod 13, with which is connected the final folder 5, is lifted by a lever, 38, acted upon by an adjustable pin, 39, carried by the rod $17^\times$, and the link $38^\times$. (See detail, Fig. 8.) As the said rod is depressed the spring $16^\times$ on it is compressed, so as to be ready to act upon the lever 38 to throw the final folding-blade 5 down, when the lever $18^\times$ is released by the cam that moves it, all substantially as in the patents referred to.

To gage the descent of the corner-controlling device 8 so as to stop near but not touch the rolls 4, I have added a rest or stop, 15. This stop, provided at its upper end with an ear, (see Figs. 2 and 19,) is passed over the rod 12, and is held upon the said rod by the adjusting-nut at the top of the rod. As the slide-rod 13 descends under the action of the spring $16^\times$ on the rod $17^\times$, connected with the lever $18^\times$, acted upon by a cam on the shaft $19^\times$, the lower end of the rest 15 strikes the shoulder 14 at the rear of the rod or head $f$, upon which the finger F is pivoted, and stops its descent, and also that of the rod 12 and corner-controller 8; but the final folder 5 is free to descend yet farther, it then compressing the spiral spring 17 about the rod 12, (see Fig. 1, and also Fig. 2,) it not, however, being numbered in this last figure. The finger has at its forward end an adjustable plate or roller-carrier, 18, attached thereto by the screws 19, the length of the finger being thus made adjustable to vary it for use in the manufacture of bags of different lengths.

To raise and lower the finger F at the proper time I have shown the link 20, pivoted to the arm 21 (see Figs. 2 and 19,) of the rock-shaft 22, having a second arm, 23, joined with a lever, 24, operated in one direction at the proper time by the cam 25 on the shaft $19^\times$, the said rock-shaft being turned in the opposite direction to lower the finger by means of the spring 26. A movable head, 27, guided on the rod $f$, carries at its lower end two arms, 28, (see Figs. 1, 4, and 12,) in which are rollers 3, preferably india-rubber, or other elastic-surfaced rollers, that, just before the side plates, $e$, drop, are made to descend and press or smooth the two diagonal portions or folds of the leading end of the diamond fold, the said rollers 3 in practice rising and releasing the paper as soon as the side plates drop upon the diamond fold. This head 27 is lifted by the link 29, connected with the arm 30 of the rocker-shaft 31, having an arm, 32, joined by link 33 with the upper end of the pivoted lever 34, acted upon by the cam 35 on the shaft $19^\times$, and is thrown down by the spring 36 on the shaft 31. The rear end of the finger has a light spring, $36^\times$, (shown in Fig. 2,) that extends backward over the front roller, 4, assists in keeping down the corner of the bag-bottom formed by the first cross-fold, the corner-controller 8 in its descent striking the end of the said spring and causing it to bend more or less to fit the bottom of the bag being folded to the roll 4.

The gear 40 on shaft $d^{10}$ engages the idle-gear 41, that turns the gear 42 and drives the shaft $19^\times$. This gear 42, through the idle-gear 43, engages one of the pinions, 44, and sets the delivery-rollers 4 in motion. Each side plate, $e$, is mounted upon a rod, $e^2$, of a carriage, $e^3$, held loosely on a cross-bar, $e^4$, having arms $e^5$, fitted to guideways in the frame, and connected with spiral springs $e^6$, to depress the crosshead and plates $e$ as the shape of the cams $g$ will permit. Between the carriages $e^3$, on the cross-bar $e^4$, is a spiral spring, $e^7$, that keeps the rollers $e^8$ of the carriages against the side faces of the double cams $g$, shaped to draw the side plates outward laterally before the usual first cross-folder blade is drawn back, and other rollers, $g^2$, of the carriages rest upon the peripheries of the said cams. The peripheries of these cams are shaped in a suitable manner to permit the side plates to descend at the times hereinbefore stated, and to be lifted after they are drawn back or outward, preparatory to being again moved inward to descend upon the paper.

Inside the paste-box $m^2$ are two upright walls, 48, to receive the pasting-plunger $m$, shaped as shown at Figs. 2, 11, and 16, it being provided with a series of vertical passages, 46, and intersecting side openings, 47. When the lower end of the paster is flush with the bottom of the paste-box, (see Fig. 2,) the side openings, 47, are covered by the wall 48. Below one of the walls 48, and in front of the slide-plate 49, is a space for the reception of gum or paste. When the plunger is thrown down to apply paste or gum to the bag-bottom on the line of parallel dashes, (see Fig. 10,) the side openings, 47, are uncovered, and the slide-plate 49 moved forward to force the paste or gum into the side and out through the vertical openings in the plunger $m$.

The slide-plate 49 is moved horizontally by means of an elbow-lever, 50, pivoted at 51 on a bracket, 52, an adjustable lug, 53, carried by the lever 50, being acted upon by the wedge-shaped end of a rod, 54, carried by the cross-head 55, fixed upon the slide-rod 13. This cross-head also carries a rod, $n$, (shown in Fig. 2 as having a lower ball-like termination to receive a sleeve, $o$, and a screw-plug, $p$,) by which means the plunger $m$ is reciprocated. The spring 56 moves the lever 50 forward.

I claim—

1. In a paper-bag machine, the former, having its receiving end A made of greater diameter than the main part of the former in advance of it, and having its edges $a$ substantially parallel, combined with the gage $b^2$ for the outside of the tube, and a support within it for the inside of the tube to give to it its proper size, substantially as and for the purpose described.

2. In a paper-bag machine, the holder C, composed of a bent rod supported in ears $c$, and provided with arms adapted to be operated to cause the descent of the holder between the feeding-rollers and folding-blades, substantially as described.

3. The holder to descend upon and hold down the end of the tube, combined with the yielding support $c^4$, upon which the tube rests, directly under the holder, substantially as described.

4. In a paper-bag machine, the finger provided with the adjustable end piece, 18, to permit the same finger to be used to lay back the end of the diamond fold for bags of different lengths and sizes.

5. The final folding-blade, slotted centrally, as described, combined with the corner-controller, provided with the rearward projection, extended through the said slot to prevent the leading pasted end of the diamond fold from being wiped over the final folding-blade as the final cross-fold is being made, substantially as described.

6. The pasting-plunger $m$, provided with the series of passages 46 47, combined with the wall-plates 48 and the slide-plate 49, to operate substantially as described.

7. In a paper-bag machine, the feeding-blade, and means, substantially as described, to move it fully forward and permit it to rest before the descent of the final folding-blade, combined with the final folding-blade, to thereafter descend and determine the final fold.

8. The delivering-rollers and corner-controller, combined with the adjustable finger or stop thereon to strike the shoulder 14 and arrest the corner-controller in its descent, substantially as described.

In testimony whereof I have signed my name to this specification in the presence of two subscribing witnesses.

CLARENCE A. CHANDLER.

Witnesses:
G. W. GREGORY,
N. E. C. WHITNEY.